United States Patent [19]

Virdee et al.

[11] Patent Number: 5,818,843
[45] Date of Patent: Oct. 6, 1998

[54] E1 COMPRESSION CONTROL METHOD

[75] Inventors: Harbhajan S. Virdee, Richardson; Mike M. Tatachar, Allen, both of Tex.

[73] Assignee: DSC Communications Corporation, Plano, Tex.

[21] Appl. No.: 597,123

[22] Filed: Feb. 6, 1996

[51] Int. Cl.⁶ .................................................. H04J 3/17
[52] U.S. Cl. ........................................ 370/435; 370/468
[58] Field of Search ................................... 370/464, 465, 370/468, 470, 471, 473, 474, 477, 478, 433, 435, 353, 357, 360, 521, 494, 495, 286, 54, 522, 527, 537, 538; 385/46, 109, 112; 364/514 A, 614 R; 375/240, 241; 395/2.91, 2.94

[56] References Cited

U.S. PATENT DOCUMENTS

| | | | |
|---|---|---|---|
| 4,897,832 | 1/1990 | Suzuki et al. | 370/287 |
| 5,065,395 | 11/1991 | Shenoi et al. | 370/435 |
| 5,280,532 | 1/1994 | Shenoi et al. | 370/474 |
| 5,357,516 | 10/1994 | Klingberg | 370/477 |
| 5,467,372 | 11/1995 | Nishitani | 375/244 |
| 5,526,397 | 6/1996 | Lohman | 379/58 |
| 5,552,079 | 9/1996 | Niki et al. | 370/478 |

OTHER PUBLICATIONS

Hodges, et al., "Developement and testing of DCME Systems," British Telecommunications Engineering, PArt 3, pp. 205–212, Oct. 11, 1992.

Kato, et al., "DCME System NCM–501," NEC Research & Development, No. 3, pp. 389–399, Jul. 1991.

Kesler, Edward A., "Digital Circuit Multiplication Equipment and Systems–An Overview," British Telecommunications Engineering, pp. 106–111, Jul. 11, 1992.

International Telecommunication Union, "General Aspects of Digital Transmission Systems,; terminal Equipments; Physical/Electrical Characteristics of hierarchical Digital Interfaces," CCITT, G.703, Geneva 1991, pp. 1–39.

International Telecommunicatio Union, "General Aspects of Digital Transmission Systems; Terminal Equipments; Synchronous Frame Strucutres Used at Primary and Secondary Hierarchical Levels," CCITT, G.704, Geneva 1991, pp. 1–33.

*Primary Examiner*—Alpus H. Hsu
*Assistant Examiner*—Kwang B. You
*Attorney, Agent, or Firm*—Baker & Botts, L.L.P.

[57] ABSTRACT

An N:1 transcoder (12, 40) with a compression data path that includes uncompressed digroup circuits (92, 94, 96, 98, and 100) each receiving N incoming uncompressed signal and extracting a plurality of control, signaling, and voice/data traffic channels therefrom, a compressor (120) coupled to the uncompressed digroup circuits (92, 94, 96, 98, and 100) and compressing data in selected ones of the extracted voice/data channels, and a compressed data circuit (126) coupled to the compressor (120) for packing the compressed data into predetermined channels of one compressed signal, and further providing control, signaling, and performance monitoring information embedded therein.

21 Claims, 6 Drawing Sheets

E1 COMPRESSION CONTROL METHOD

TECHNICAL FIELD OF THE INVENTION

This invention is related in general to the field of telecommunications systems. More particularly, the invention is related to an N:1 E1 compression method.

BACKGROUND OF THE INVENTION

In the early days of telecommunication, a copper wire medium was used to carry a single information channel. Because the greatest proportion of cost is in the materials and construction of the physical link, telephony engineers have developed ways to pack multiple channels onto a single physical link. Frequency division multiplexing (FDM) and time division multiplexing (TDM) have been devised to multiplex multiple streams of analog and pulse code modulation (PCM) digital signals, respectively, into one. For digital signals, the TDM hierarchy is DS0 through DS4, where a DS0 is a single 0.064 Mbits/sec channel and a DS4 is 4,032 message channels (DS0s) multiplexed together.

A similar TDM scheme is used in international telephone systems based on 32-channel format. The international digital systems, based on International Telecommunication Union CCITT's G.700 Series Recommendations, are commonly called E1 or CEPT-1. The E1 signals are based on blocks of 32 channels or time slots, of which time slot 0 and time slot 16 are typically used for control and signaling, respectively.

Although both the U.S. and international digital systems provide for the multiplexing of DS0 or E1 signals to form higher rate signals, greater efficiency of the physical telecommunications link is desired. The capability to transport a higher concentration of voice and data channels advantageously decreases the number of physical links and further lower the toll exacted for connecting the calls.

SUMMARY OF THE INVENTION

Accordingly, there is a need for a compression method that concentrates multiple E1 signals onto one E1 link.

In accordance with the present invention, an N:1 E1 compression method is provided which eliminates or substantially reduces the disadvantages associated with prior methods.

In one aspect of the invention, an N:1 E1 compression method includes the steps of receiving N incoming E1 signals, extracting a plurality of voice/data channels from the N incoming E1 signals, and also extracting control, monitoring, and status information channels from the N incoming E1 signals. Thereafter, compress data in extracted voice/data channels, generate and pack control, monitoring, and status information in predetermined channels in one compressed E1 signal, and pack the compressed data into available channels in the compressed E1 signal.

In another aspect of the invention, four E1 signals are ADPCM compressed and packed into available channels in one compressed E1 signal. Digital speech interpolation may also be employed.

In yet another aspect of the invention, the compressed E1 signal includes control, monitoring, and status information of channels in the four E1 signals embedded in predetermined channels of the compressed E1 signal.

BRIEF DESCRIPTION OF THE DRAWINGS

For a better understanding of the present invention, reference may be made to the accompanying drawings, in which.

DETAILED DESCRIPTION OF THE INVENTION

Figure 1:
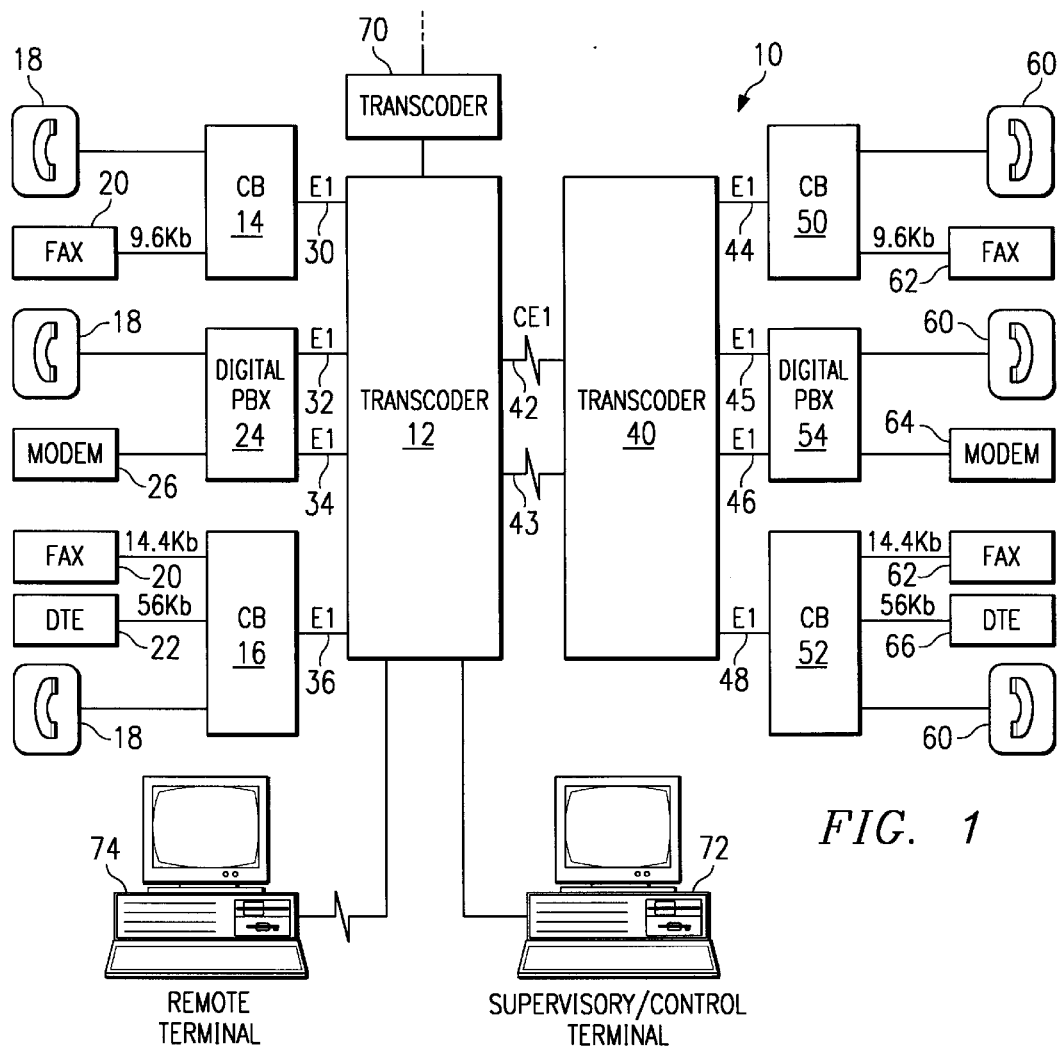
FIG. 1 is a simplified block diagram showing typical applications of transcoders constructed in accordance with the teachings of the present invention.

The preferred embodiment(s) of the present invention is (are) illustrated in FIGS. 1–8, like reference numerals being used to refer to like and corresponding parts of the various drawings.

Referring to FIG. 1, a typical telephony application 10 of a transcoder 12 of the present invention is shown. Transcoder 12 is coupled to channel banks (CB) 14 and 16, which digitize and multiplex multiple voice and data signals onto a single E1. The voice and data signals may originate from telephones 18, facsimile machines (FAX) 20, and data terminal equipment (DTE) 22. Transcoder 12 may be also coupled to digital private branch exchanges (PBX) 24, which may be coupled to telecommunications equipment including telephones 18 and modems 26. Channel banks 14 and 16 and digital private exchange 24 are coupled to transcoder 12 via E1 links 30–36, each transporting data and voice channels in E1 format.

Transcoder 12 compresses the four E1 signals on links 30–36 into a single E1. Transcoder 12 is coupled to a remote transcoder 40 using a single E1 link 42 to transport the compressed E1 (CE1). E1 link 42 may be any transmission medium, including copper, optical, and wireless. A redundant link 43 is also provided in case of link 42 failure. Remote transcoder 40 decompresses the compressed E1 into four E1 signals and provides them on E1 links 44–48 to channel banks 50 and 52, and digital private branch exchange 54, which are coupled to telecommunications equipment including telephones 60, facsimile machines 62, modems 64, and data terminal equipment 66.

In a similar manner, voice and data may be compressed by remote transcoder 40 onto E1 link 42, and decompressed by transcoder 12 into the respective E1 signals.

Multiple transcoders 70 may be coupled to transcoder 12 in a daisy-chain fashion, for example, via RS-232 links, to communicate control and/or alarm information, for example. A supervisory/control terminal 72 may be coupled to transcoder 12. Entry of programming parameters and control of transcoders 12 and 40 may be performed on supervisory/control terminal 72. Monitoring and control of remote transcoder 40 may be performed by transporting monitoring and control information to and from remote transcoder 40 using bandwidth in the compressed E1. Monitoring and control of transcoders 12 and 40 may also be performed via a remote terminal 74 coupled to transcoder 12. In this manner, craft personnel may access transcoder 12 and/or transcoder 40 by dialing up through remote terminal 74.

Figure 2:
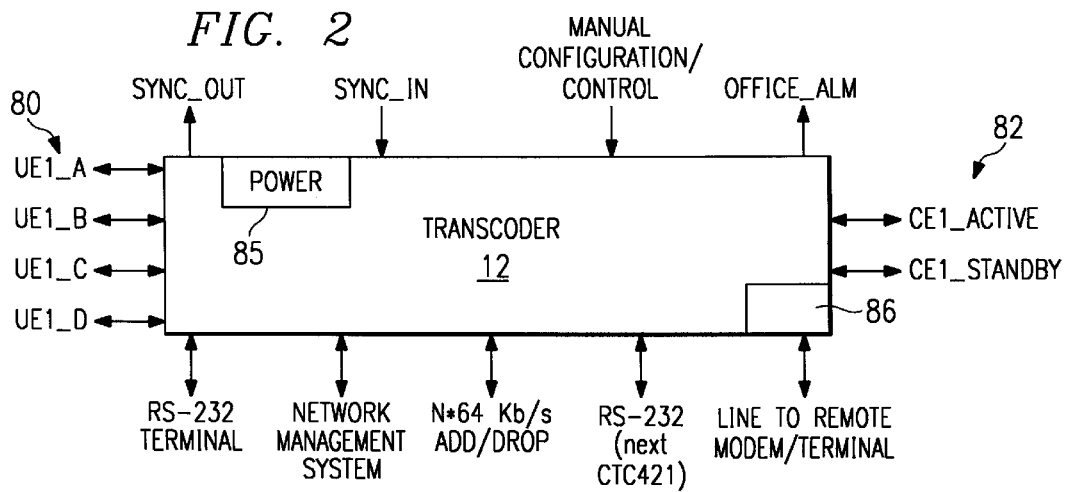
FIG. 2 is a block diagram showing input and output to a transcoder constructed according to the teachings of the present invention.

FIG. 2 shows the important input and output signals of transcoder 12. N bidirectional uncompressed E1 signals (shown as UE1A, UE1B, UE1C, and UE1D) are received by or provided by transcoder 12. Two bidirectional compressed E1 signals CEACTIVE and CESTANDBY are also received by or provided by transcoder 12. Compressed E1 signals CE ACTIVE and CESTANDBY are redundant signals provided as backups of one another. A DC or AC power supply and its backup supply 85 are included to provide power and backup power to transcoder 12.

SYNCIN is an external reference clock signal, which may be used to generate a system synchronization clock signal. The generated system synchronization clock signal may be provided as a SYNCOUT clock signal to other co-located transcoders 70 (FIG. 1) daisy-chained with transcoder 12 so that synchronization may be achieved with a single timing source.

OFFICEALM is an output signal generated by transcoder 12 to indicate alarm conditions.

As indicated above, transcoder 12 operations may be monitored and controlled via a local terminal or a remote terminal through a modem connection 86. A RS-232 link is also shown for connection to daisy-chained co-located transcoder(s).

Additional control inputs to transcoder 12 may include manually configurable selection/switches located on a front panel (FIG. 3), and a network management system (NMS) control and configuration parameters. NMS is a serial link operating under Simple Network Management Protocol (SNMP) as known in the art. An N*64 kb/s add/drop link is further provided between the local transcoder and the remote transcoder.

Figure 3:
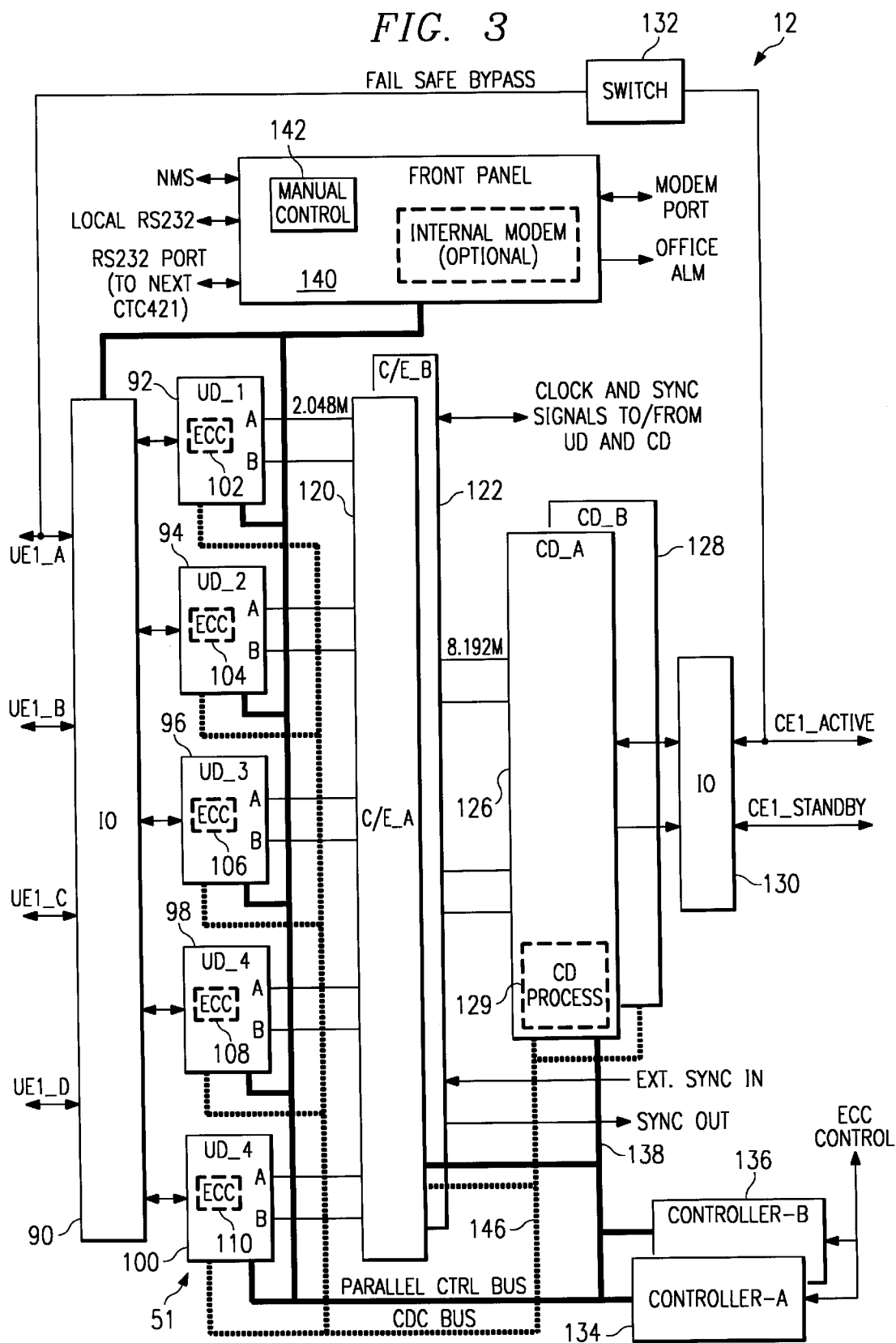
FIG. 3 is a block diagram of an embodiment of the transcoder.

FIG. 3 is a simplified functional block diagram of transcoder 12. Because the circuits perform different functions depending on whether a compression or decompression of E1 signals is being desired, FIG. 3 provides an overview of relevant circuits involved and FIGS. 4 and 5, described below, set forth a more detailed operational discussion of each circuit block.

Referring to FIG. 3, an input/output circuit (IO) 90 is used to provide physical connection to the incoming and outgoing E1 signals. Input/output circuit 90 may also provide functions such as impedance matching to satisfy any interface requirement. Input/output circuit 90 is coupled to uncompressed digroup circuits UD1 through UD4 92–98. A redundant uncompressed digroup circuit UDR 100 is further coupled to input/output circuit 90, which may switch any of the incoming uncompressed E1 signals thereto in case of any equipment failure of UD1 through UD4 92–98. Uncompressed digroup circuits 92–100 may each include an echo-canceler circuit (ECC) 102–110. Uncompressed digroup circuits 92–100 are further coupled to a compress/expand circuit C/EA 120 and its redundant copy C/EB 122. Compress/expand circuit 120 and 122 performs the compression or expansion function. One compress/expand circuit C/EA or C/EB 120 or 122 is designated as active and the other standby during normal operations. A failure of one immediately causes the standby operational circuit to be the active circuit.

A compressed data circuit CDA 126 and its redundant copy CDB 128 are coupled to compress/expand circuits 120 and 122. Compressed data circuits 126 and 128 either packs compressed data into available bandwidth in the compressed E1 signal or extracts embedded voice/data and control and signaling information from the compressed E1 signal. A CD processor 129 resides in compressed data circuit 126 and 128. CD processor 129 provides real-time traffic information every 16 ms, for example. CD processor 129 may also be instructed to insert a predetermined data pattern into specific channels of the E1 signals to verify circuit operations and to isolate faults in transcoder 12.

A second input/output circuit (IO) 130 provides physical connections for the outgoing or incoming compressed E1 signals CEACTIVE and CESTANDBY. Input/output circuit 130 may also provide for line drivers and isolation functions.

In case of catastrophic failure, such as power loss, uncompressed E1 signal on UE1A may be connected through a switch 132 directly to compressed E1 CE1ACTIVE. Conditions that warrant such E1 signal bypass include the failure of both compressed data circuits CDA and CDB 126 and 128; the failure of both compress/expand circuits C/EA and C/EB 120 and 122; total power loss to transcoder 12 (including any redundant power supplies); and loss of sync detected by compressed data circuit 126 and 128 for a predetermined period of time. A predetermined number of E1 overhead bits are used to inform remote transcoder 40 of a bypass condition, so that remote transcoder 40 may recognize the transmitted E1 signal as an uncompressed E1 signal.

Controller circuits CONTROLLERA and CONTROLLERB 134 and 136 provide for the communication and control between all functional circuits via a control bus 138. Control bus 138 may include a data bus, address bus, and control lines. Controller circuits 134 and 136 may select a control and/or communication target by using the control lines and further select specific locations within the target circuit by using the address bus. A watchdog timer may be used to continually monitor the operation of controller circuits 134 and 136. If a failure is detected in one controller circuit, the watchdog timer times out and deactivates the currently active controller circuit and activating the redundant controller circuit. Controller circuits 134 and 136 also may communicate control parameters to echo cancelers (ECC) 102–110 via an additional bus. Controller circuits 134 and 136 further have access to a front panel 140, which may provide some visual alarm indicators, such as LEDs or an alphanumeric display, and RS232 connections to local and remote terminals as well as to any co-located transcoders. A manual control 142 may further provide a menu-driven input for a user to enter transcoder control and operational parameters.

A CDC bus 146 provides for the communication of signaling and overhead information between uncompressed digroup circuits 92–100 and compressed data circuits 126 and 128. Each uncompressed digroup circuit 92–100 sends an analysis of its incoming uncompressed E1 channels to compressed data circuit 126 and 128 to be used in the packing of the data from all incoming channels.

Figure 4:
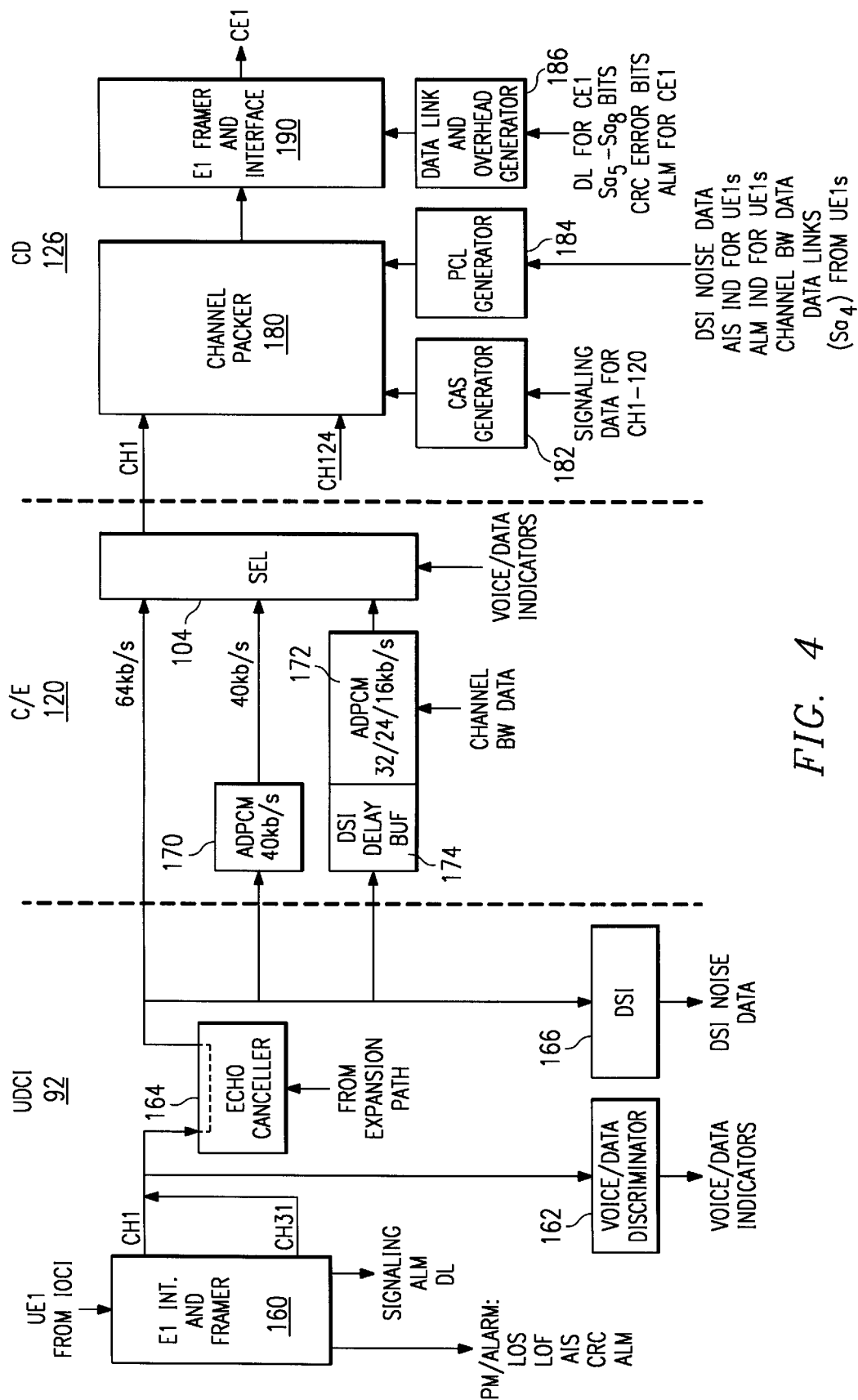
FIG. 4 is a block diagram showing a compression data path.

Referring to FIG. 4, a compression data path from an uncompressed digroup circuit 92 to compress/expand circuit 120 then to compressed data circuit 128 is shown. In this direction, four E1 data streams are compressed into a single E1 data stream, which is then transmitted to remote transcoder 40. Uncompressed digroup circuit 92 receives a standard E1 2.048 Mb signal that electrically conforms to International Telecommunication Union CCITT Recommendations G.703 Physical/Electrical Characteristics of Hierarchical Digital Interfaces and has the frame format of CCITT specifications G.704 Synchronous Frame Structures Used at Primary and Secondary Hierarchical Levels. According to ITU G.703 and G.704, an E1 signal has 32 time slots. Time slot 0 is assigned to carry framing and control information, and time slot 16 is assigned to transport common channel signaling (CCS) or channel associated signaling (CAS). The remaining time slots are used to carry subscriber bearer channels.

Uncompressed digroup circuit 92 includes an E1 interface and framer circuit 160 that converts the received E1 signal from bipolar to unipolar format, and extracts the 64 kb signals in time slots 1 through 32. If time slot 16 is configured for channel associate signaling, then the A, B (or A, B, C, D) signaling information is also extracted by further processing of channel 16. Performance and alarm condition monitoring on the E1 signal is also done and the results passed on to controller circuit 136 and 138 (FIG. 3). Uncompressed digroup circuit 92 also includes a discriminator 162 which analyzes each of the 31 channels for voice/data determination. The voice/data indication is used to further analyze the signal according to the type of activity.

An optional echo canceler 164 may be included to provide echo-canceling capability for the voice channels. Uncompressed digroup circuit 92 may be configured to operate with or without echo canceler 164. In speech channels, a determination is further made as to when there is "silence" so that digital speech interpolation (DSI) techniques may be applied by a DSI circuit 166. During the "silence" periods, the DSI algorithms determine the noise level on the line and the noise parameters are provided to compressed digroup circuit 92 for transmission for the eventual reconstruction of the "silence" at remote transcoder 40.

In case of voice-band data, a determination is made as to whether the data rate is greater than a certain rate, 9.6 kb for example. This information is relayed to compression/expansion circuit 120 (through controller 134) not to compress the data.

Uncompressed digroup circuit 92 also determines whether a channel contains high speed data, such as 56 kb or 64 kb, in which case a clear channel would be allocated on the compressed E1 for that incoming channel.

A multiplexed 2.048 Mb data stream containing the voice/data channels is provided from uncompressed digroup circuit 92 to compress/expand circuit 120. Controller 134 controls the operation of compress/expand circuit 120, which has the ability to compress 124 (31×4) channels from 64 kb to 40, 32, 24, or 16 kb using adaptive differential pulse code modulation (ADPCM) techniques compatible with CCITT G.721 and G.723. If the data rate is less than or equal to 9.6 kb then 40 kb ADPCM compression 170 is used to compress the signal. Speech signals are shown compressed in ADPCM functional block 172. A delay buffer 174 may be used to provide delay when DSI is used on the speech channels.

The level of compression is fixed for pre-assigned channels and is dynamic for channels set to AUTO. An eight bit PCM word from each channel is compressed into 5, 4, 3 or 2 bits as dictated by controller 134. For clear pass-through channels there is no compression and the 8 bit word is passed through compress/expand circuit 120 unaltered. Timing synchronization and clock selection/generation is also accomplished by compress/expand circuit 120.

The compressed channels from compress/expand circuit 120 are provided to compressed data circuit 128. A channel packer 180 picks up channels containing 16 kb or greater bandwidth and packs them in the available bandwidth. The signaling channels is generated by a generator 182. A proprietary communications link (PCL) generator 184 also constructs a PCL channel with information from uncompressed digroup circuit 92 and controller circuit 134. Finally, the proprietary data link (PDL), overhead channel, and time slot 0 are constructed by generator 186 and attached to the packed data. The binary signal is then converted to bipolar E1 by the interface and framer 190 for output. Details of the proprietary communications link and proprietary data link are set forth below.

Figure 5:
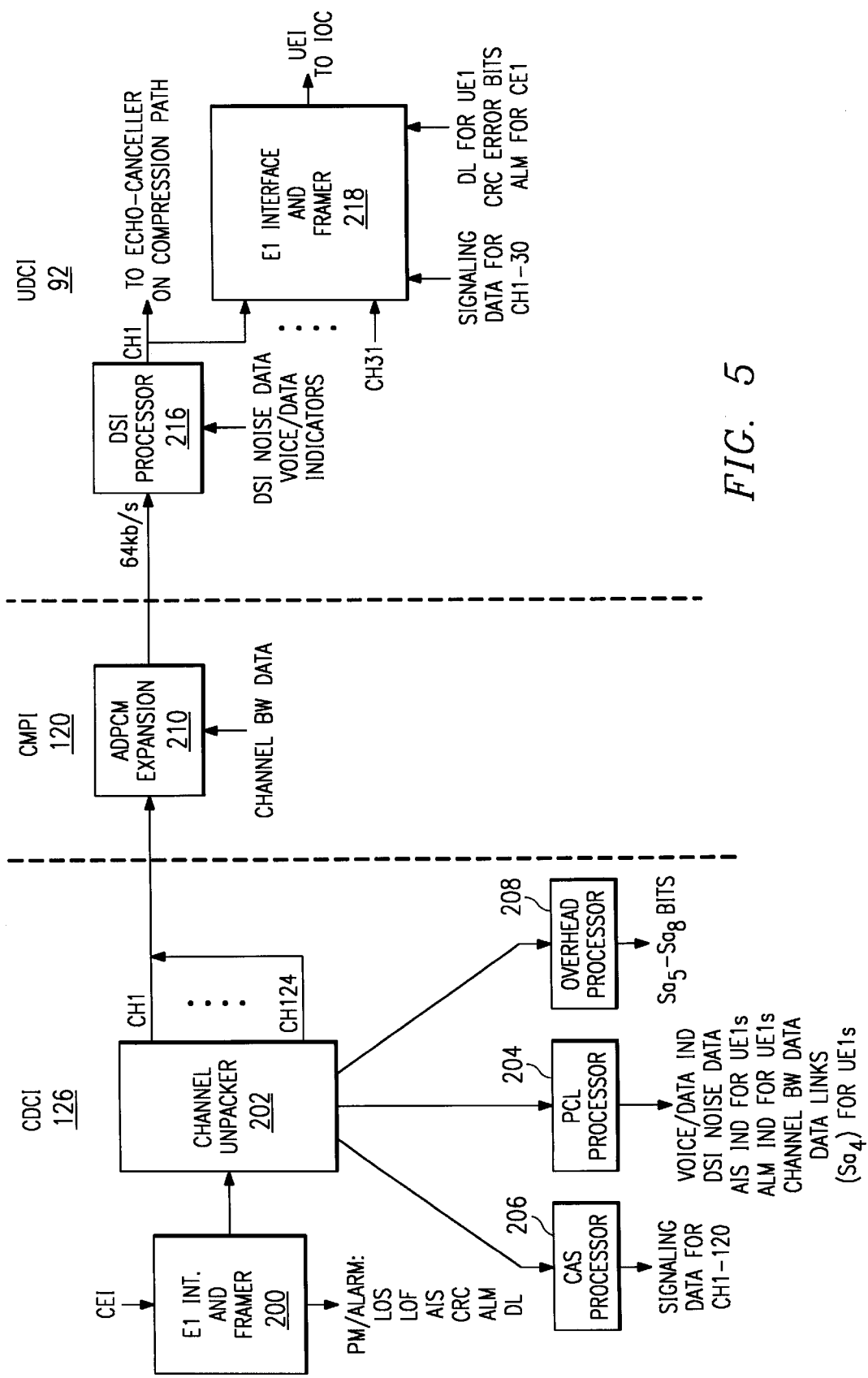
FIG. 5 is a block diagram showing a decompression data path.

FIG. 5 shows the expansion data path through the compressed data circuit 126, compress/expand circuit 120, and uncompressed digroup circuit 92. In this direction, a single compressed E1 is expanded into four separate E1 data streams which are then transmitted to standard E1 equipment such as D4 channel banks.

In the expansion direction, an interface and framer circuit 200 of compressed data circuit 126 interfaces to the incoming compressed E1 signal, converts it from bipolar to unipolar format, and further provides enhanced performance monitoring functions. After framing and overhead extraction, a channel unpacker 202 unpacks the channels and extracts the proprietary communications link (PCL) data. The proprietary communication link data is provided to a processor 204, which evaluates it. This data is used to configure transcoder 12 as well as provide the necessary overhead information ($Sa_4$ bits, RAI bit, Bandwidth, DSI noise parameters) to uncompressed digroup circuits 92 through CDC bus 146 (FIG. 3). If the proprietary communications link data indicates the presence of one or more signaling channel(s), then the channel(s) are also extracted and provided to a CAS processor 206 for processing, and the appropriate information/data are sent to uncompressed digroup circuit 92 through CDC bus 146. The extracted overhead is also provided to an overhead processor 208 for processing. Compressed data circuit 126 extracts the embedded 120 voice/data (or 124 in case of no signaling) channels from the incoming compressed E1 and passes them on to compress/expand circuit 120 to be decompressed. A multiplexed 8.192 Mb/s data stream links compressed data circuit 126 with compress/expand circuit 120 and contains the 120 or 124 voice/data channels.

Compress/expand circuit 120 includes an expansion circuit 210, which locates each of the voice/data channels within the 8.192 Mb/s data stream, and by using the bandwidth (BW) information provided by compressed data circuit 126, expands them from 2, 3, 4, 5, or 8 bits to 8 bits. Expansion circuit 210 further groups the 30 (or 31 when no signaling is used) groups of data into a multiplexed 2.048 Mb/s data stream and sends it to the appropriate uncompressed digroup circuit 92 (UD1 through UD4 or UDR).

Uncompressed digroup circuit 128 locates each of the 64 kb channels within the received 2.048 Mb/s data stream from compress/expand circuit 120. For each channel, any required substitution of DSI noise is carried out by a DSI processor 216 using the noise parameters provided by compressed data circuit 126 via CDC bus 146. In the case of CAS signaling, channel 16 of the uncompressed E1 is constructed by an interface and framer circuit 218 from either a, b or a, b, c, d signaling as provided by compressed data circuit 126. Channel 0 (framing channel) is constructed from the overhead, including the $Sa_4$–$Sa_8$, ALM bits. The constructed and decompressed E1 signal is passed on to input output circuit 90 (FIG. 3).

Figure 6:
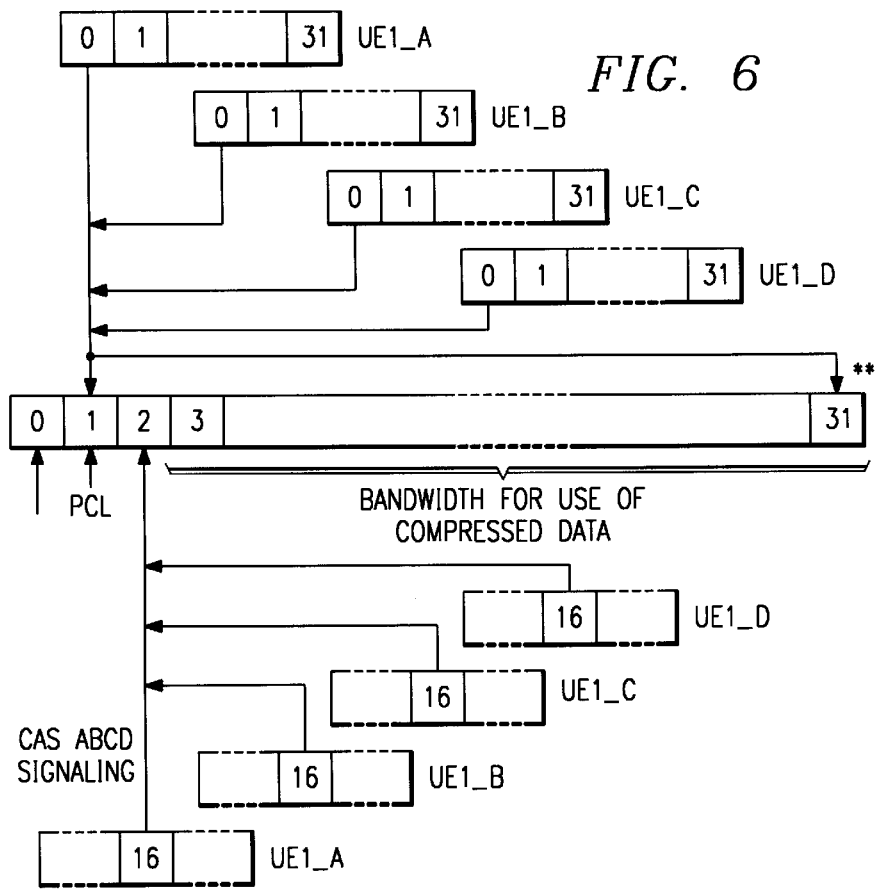
FIG. 6 is a diagram showing an exemplary bit mapping of four uncompressed E1 to one compressed E1.
Figure 7:
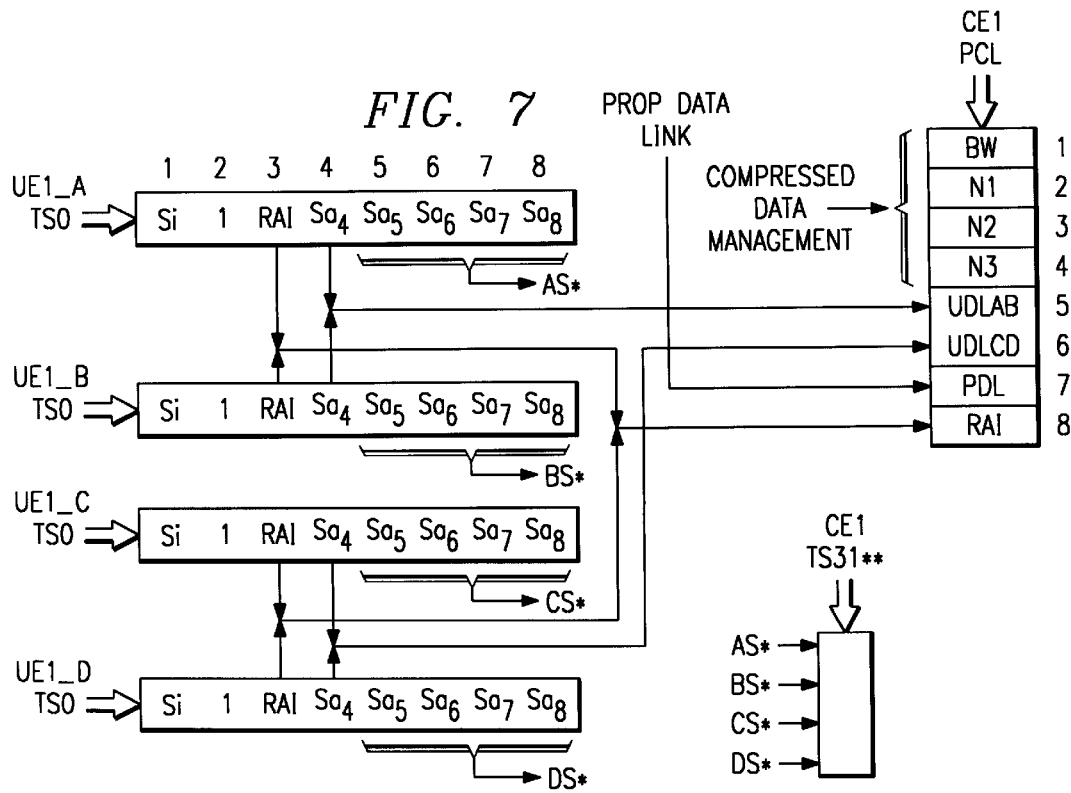
FIG. 7 is a diagram showing an exemplary bit mapping of control and overhead information of four uncompressed E1 to time slot(s) in compressed E1.
Figure 8:
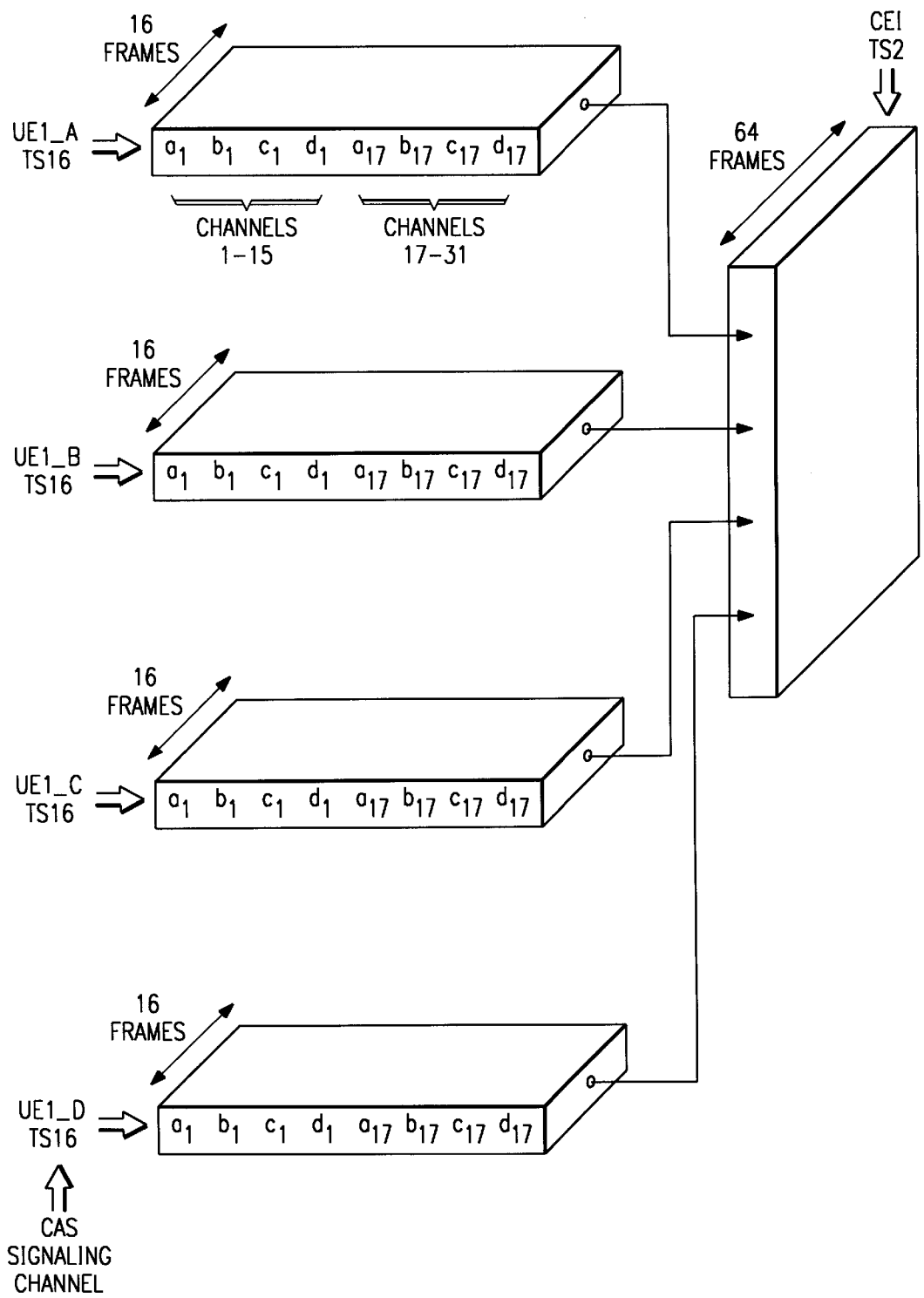
FIG. 8 is a diagram showing an exemplary bit mapping of channel associated signaling (CAS) information from four uncompressed E1 to time slot(s) in compressed E1.

The operations of transcoders 12 and 40 may be better understood by referring to FIGS. 6–8, which provides an exemplary mapping of control, signaling, and bearer channels between compressed and uncompressed E1. Fixed bandwidth is required to pass through E1 overhead from the uncompressed E1 lines and a proprietary communications link (PCL) is used to configure the remote receiving transcoder so that is has the necessary information to reconstruct each of the E1 links at the remote end. In addition, if signaling is to be transferred, then fixed bandwidth is also allocated for this purpose. There are two modes of signaling that are commonly used in E1 transmission systems: common channel signaling (CCS) and channel associated signaling (CAS). Either signaling mode can be accommodated. The construction of the compressed E1 signal depends on which of these signaling system is being used.

Referring to FIG. 6, an exemplary mapping of control, signaling and bearer channels is shown. It is worthwhile to note that while FIG. 6 shows specific time slots being used to carry certain signals, such designation is an example thereof, and the teachings of the present invention are not limited to the specific mapping shown therein. In each E1 signal frame, there are a total of 32 time slots, numbered TS0 through TS31, where each time slot has a bandwidth of 64 kb/s. Alternate frames of time slot 0 (TS0) are always used for framing and overhead information. Time slot 0 of the compressed E1 signal is used to carry a frame alignment signal and other control information such as cyclic redundancy checking (CRC), remote alarm indicator (RAI), and $Sa_{4-8}$ bits. The format of time slot 0 is the same as that of standard E1.

As shown in FIG. 6, selected information from time slots 0 of uncompressed E1 signals, UE1A through UE1D, may be mapped to a proprietary communications link (PCL) of compressed E1, CE1ACTIVE and CE1STANDBY, which may occupy time slot 1. The proprietary communications link provides end-to-end configuration, control, and monitoring functions, which includes remote alarm indicator, bandwidth, DSI noise parameters, and a proprietary data link (PDL) bit for high speed alarm and diagnostic reporting to the remote transcoder. Certain overhead bits, including $Sa_{5-8}$, may be optionally included in time slot 31 or the last time slot in a factional E1 application. Signaling in time slot 16 of uncompressed E1 is further mapped to time slot 2 of compressed E1, for example. Time slots 3–31 are used to carry compressed data from the four uncompressed E1 signals.

Referring to FIG. 7, a more detailed exemplary mapping of time slots 0 of uncompressed E1 signals into the proprietary communications link of the compressed E1 signal is shown. Proprietary communications link is configured in a multiple-frame format, where a certain number of frames carry channel bandwidth information (BW), idle noise parameters for DSI (N1–N3), the $Sa_4$ bits (the data link bit) of uncompressed E1 signals, remote alarm indicator (RAI), and a proprietary data link (PDL) bit used for high speed alarms/status/control purposes. PDL may have a multi-frame structure carrying signaling information, software download control and status, and operational control, alarm and status of various circuit components. Because the $Sa_4$ bit may be used as a message-based data link used for operations, maintenance and performance monitoring, as recommended by CCITT, end-to-end transparency of this bit is provided. When the Sa4 bits in the uncompressed E1s are not required to be transferred then this bandwidth can be used for other purposes. Similarly, RAI end-to-end transparency is also provided. Certain frames of the proprietary communications link may be used to convey performance information about each uncompressed E1 to the remote transcoder. As shown, $Sa_{4-8}$ bits of uncompressed E1s may also be optionally carried in time slot 31 or the last time slot used in a factional E1 application if end-to-end transparency is desired.

FIG. 8 shows an exemplary mapping of channel associated signaling to compressed E1. In E1, a 16-frame structure of time slot 16 is used for channel associated signaling. Signaling of the four uncompressed E1s is mapped to a time slot, for example time slot 2, of compressed E1. The chosen time slot in a 32-frame format is used to support signaling (a, b) for all the 120 (30×4) incoming uncompressed E1 channels with a signaling update every 4 ms. If it is necessary to transfer more than two signaling bits, such as a, b, c, and d per channel, then the update rate is 8 ms with a 64-frame format.

In the worse case when channel associated signaling is used, 28 time slots (32–3) remain to be used for voice/voiceband data, assuming there are no other clear pass-through 64 kb/s channels preassigned. Assuming 120 active voice channels, the ADPCM compression required is from 8 bits to 1.87 bits (28*8/120). With DSI providing additional bandwidth gain, the ADPCM compression can provide a speech quality of 24 kb/s ADPCM for all channels.

The signaling information in common channel signaling is passed unaltered over the compressed E1. The time slots carrying common channel signaling, typically time slot 16, from UE1A to UE1D are mapped to predetermined time slots, TSa through TSd, in compressed E1. If not all four uncompressed E1s are required to pass through common channel signaling, then the system configuration would allow only specified uncompressed E1s to pass through signaling. For instance, if only UE1D is to pass the common channel signaling, then TSd on compressed E1 carries the signaling information and TSa thru TSc are available for voice/data traffic. Accordingly, TS2–TS30 may be available to be allocated to voice/data traffic in a dynamic or preassigned manner as configured through the control software. Any unused TSa, TSb, TSc, TSd may be used for dynamic allocation to voice/data channels.

In the worse case, if all the above fixed bandwidth is required, it leaves 25 time slots (32–7) to be used for voice/voice-band data, assuming there are no other preassigned clear pass-through 64 kb/s channels preassigned. The number of time slots available in the compressed E1 for voice/voice-band data is directly reduced by the number of pre-assigned pass-through (64 kb/s) channels.

Transcoder 12 may use a combination of ADPCM and DSI techniques to compress the incoming speech and/or data channels in uncompressed E1. An 8-bit PCM coded sample is compressed to 5, 4, 3, or 2 bits resulting in 40, 32, 24, or 16 kb ADPCM stream, respectively. Any frame that contains any voice energy is not used in the DSI application, so that voice transmission is not subject to clipping that is sometimes found in pure DSI applications.

Fractional E1 applications are supported by transcoder 12 of the present invention. The bandwidth available on the compressed E1 may be set via an "Available BW" parameter, an example is given below:

1. 32 –> use all (0–31) 64 kb channels; this is the default setting;

2. 24 –> use only 0–23 64 kb channels; and 3. 16 –> use only 0–15 64 kb channels.

"Available BW" parameter can be any value 4 through 32. When the "Available BW" parameter is less than 32, then any unused channels of the compressed E1 may be filled with a predefined pattern.

After all the bandwidth for fixed and pre-assigned channels has been allocated, the remaining bandwidth is automatically assigned in the best possible manner to the incoming channels, depending on traffic conditions. As discussed above, it is further possible to limit the available bandwidth for dynamic allocation to support fractional E1 applications. The total bandwidth available on the compressed E1 link can be defined as 16, 24, or 32 (default) channels of 64 kb bandwidth. In a fractional case, the last of the channels of the available bandwidth may carry the $Sa_{5-8}$ overhead from all uncompressed E1s, if the system is so configured.

The voice/data (V/D) channels contain the bandwidth that can be dynamically assigned to incoming channels automatically or pre-assigned to certain incoming channels manually. In certain applications, such as high speed data rates greater than 56 kb, it may be necessary to pre-assign dedicated 64 kb channels. Each of these assignments uses up the 8-bit word and is not subject to DSI. The table below is an exemplary bandwidth allocation scheme for compressed E1. A, B . . . are eight-bit patterns conveyed in the PCL indicative of bandwidth allocation configuration.

Bandwidth Allocation for Compressed E1

| Control Configuration (PCL) | Av. BW | Signaling Option | Pass OVHD | TS_a | TS_b | TS_c | TS_d | Other Time Slots |
|---|---|---|---|---|---|---|---|---|
| A | 32 | CAS:ab | NO | 32 Fr CAS | V/D | V/D | V/D | V/D |
| B | 32 | CAS:ab | YES | 32 Fr CAS | V/D | V/D | V/D | V/D; TS31: OVHD |
| C | 32 | CAS:abcd | NO | 64 Fr CAS | V/D | V/D | V/D | V/D |
| D | 32 | CAS:abcd | YES | 64 Fr CAS | V/D | V/D | V/D | V/D; TS31: OVHD |
| E | 32 | CCS:ALL | NO | CCS-A | CCS-B | CCS-C | CCS-D | V/D |
| F | 32 | CCS:ALL | YES | CCS-A | CCS-B | CCS-C | CCS-D | V/D; TS31: OVHD |
| G | 24 | CAS:ab | NO | 32 Fr CAS | V/D | V/D | V/D | to TS23: V/D |
| H | 24 | CAS:ab | YES | 32 Fr CAS | V/D | V/D | V/D | V/D; TS23: OVHD |
| I | 24 | CAS:abcd | NO | 64 Fr CAS | V/D | V/D | V/D | to TS23: V/D |
| J | 24 | CAS:abcd | YES | 64 Fr CAS | V/D | V/D | V/D | V/D; TS23: OVHD |
| K | 24 | CCS:ALL | NO | CCS-A | CCS-B | CCS-C | CCS-D | up to TS23: V/D |
| L | 24 | CCS:ALL | YES | CCS-A | CCS-B | CCS-C | CCS-D | V/D; TS23: OVHD |
| M | 16 | CAS:ab | NO | 32 Fr CAS | V/D | V/D | V/D | up to TS15: V/D |
| N | 16 | CAS:ab | YES | 32 Fr CAS | V/D | V/D | V/D | V/D; TS15: OVHD |
| O | 16 | CAS:abcd | NO | 64 Fr CAS | V/D | V/D | V/D | up to TS15: OVHD |
| P | 16 | CAS:abcd | YES | 64 Fr CAS | V/D | V/D | V/D | V/D; TS15: OVHD |
| Q | 16 | CCS:ALL | NO | CCS-A | CCS-B | CCS-C | CCS-D | up to TS15: V/D |
| R | 16 | CCS:ALL | YES | CCS-A | CCS-B | CCS-C | CCS-D | V/D; TS15: OVHD |
| S | 32 | NONE | NO | V/D | V/D | V/D | V/D | up to TS31: V/D |
| T | 32 | NONE | YES | V/D | V/D | V/D | V/D | V/D; TS31: OVHD |
| U | 24 | NONE | NO | V/D | V/D | V/D | V/D | up to TS23: V/D |
| V | 24 | NONE | YES | V/D | V/D | V/D | V/D | V/D; TS23: OVHD |
| W | 16 | NONE | NO | V/D | V/D | V/D | V/D | up to TS15: V/D |
| X | 16 | NONE | YES | V/D | V/D | V/D | V/D | V/D; TS15: OVHD |

Accordingly, depending on the bandwidth configuration, there are between 30 and 25 channels available for voice/data communication between the two transcoders. These channels provide a contiguous bandwidth for allocation to the incoming calls. The maximum allowable data calls can be set up by the user via the "DATA" parameters. These data calls are automatically allocated 40 kb or 64 kb bandwidths as decided by the call parameters, such as data rate, which are automatically detected by the resident hardware on the uncompressed digroup circuit 92 (FIG. 3). Once a specific bandwidth has been allocated to the data call, it stays fixed for the duration of the call. All voice calls and any data calls over the maximum allowed are compressed with DSI application into the remaining bandwidth.

In certain applications, certain channels can be blocked to normal traffic. This feature may be useful when some of the common channel signaling channels are to be passed through. For example, if only UE1A needs its associated signaling passed through and the other common channel signaling channels associated with UE1B through UE1D are to be blocked, then a "NONE" signaling option may be selected and the common channel signaling channels are assigned clear channel on the compressed E1. Clear (64 kb) or zero (0 kb) bandwidth may be pre-assigned to any one of the incoming 124 channels.

Controller 134 (FIG. 3) firmware in remote transcoder 40 may be updated through the compressed E1 link using predetermined bits of the PCL. For example, the bits devoted to data link bits ($Sa_4$) may be temporarily used for the software download. Download may be initiated through controller 134 software and controlled and monitored at the remote unit through the PDL.

Voice, voice-band data, and high speed data channels are supported with the maximum number of data channels being determined by the customer via a "DATA" parameter. All data channels are automatically assigned a specific bandwidth based on their data rates and are not subject to DSI. However, once the data channels (high speed and dial-up) equal the "DATA" parameter, additional data channels may be subject to the same compression as voice channels.

Comprehensive traffic statistics for all channels that have the bandwidth allocated dynamically are provided. The statistical computations and updates are performed on a periodic basis. Local or remote terminals coupled to transcoder 12 may display the computed statistics at set intervals. A statistics history for a predetermined number of days may be kept in a memory of controller 134. Statistics may be monitored and computed for channel activity, bit rate, blocking, and voice/data with data rate breakdown.

For proper operation, the information transfer between local and remote transcoders 12 and 40 (FIG. 1) must be properly synchronized. A MASTER/SLAVE synchronization strategy specifies that one unit is MASTER and the other side unit is SLAVE, where the SLAVE extracts timing from the received compressed E1. The MASTER can extract timing from any one of the given sources, including external and internal reference clock signals. The transmit of the compressed E1 is thus derived from the system clock, and the transmit of the uncompressed E1 can either be derived from a system clock or the option of loop timing is available. Daisy-chained co-located transcoders may derive synchronization from one single source by using SYNCIN and SYNCOUT (FIG. 2).

It may be seen that although the transcoder and the compressed E1 of the present invention have been described as having a four-to-one (4:1) compression ratio, the present invention is not so limited. A compression ratio of N:1, where N is greater than 1, may be achievable without undue experimentation. The compression ratio may be selected based on available bandwidth and implementation applicability and practicability.

Although the present invention and its advantages have been described in detail, it should be understood that various changes, substitutions and alterations can be made therein without departing from the spirit and scope of the invention as defined by the appended claims.

What is claimed is:

1. An N:1 E1 compression method, comprising the steps of:
    receiving N incoming E1 signals;
    extracting a plurality of speech, high speed voice-band data and digital data channels from said N incoming E1 signals;
    extracting control, monitoring, and status information channels from said N incoming E1 signals;
    distinguishing channels carrying speech traffic from channels carrying digital data traffic;
    distinguishing channels carrying high-speed voice-band data traffic;
    compressing data in channels carrying speech traffic and high-speed voice-band data traffic;
    compressing data in channels carrying digital data traffic in response to a data rate of said digital data traffic;
    generating and packing control, monitoring, and status information in predetermined time slots in one compressed E1 signal; and
    packing said compressed data into available time slots in said compressed E1 signal.

2. The N:1 E1 compression method, as set forth in claim 1, wherein said packing step further comprises packing selected data in pre-assigned time slots in said compressed E1 signal.

3. The N:1 E1 compression method, as set forth in claim 1, wherein said packing step includes the step of packing said compressed data in a predetermined number of time slots less than a number of available time slots to support fractional E1.

4. The N:1 E1 compression method, as set forth in claim 1, wherein said data compressing includes the steps of:
    determining available bandwidth; and
    compressing said data at a highest rate in response to said available bandwidth.

5. The N:1 E1 compression method, as set forth in claim 1, further comprising the step of performing echo canceling on selected channels.

6. The N:1 E1 compression method, as set forth in claim 1, wherein said packing step further comprises the step of packing signaling information in said compressed E1 signal.

7. The N:1 E1 compression method, as set forth in claim 6, wherein said step of packing signaling information includes the step of packing common channel signaling information in at least one predetermined time slot in said compressed E1 signal.

8. The N:1 E1 compression method, as set forth in claim 6, wherein said step of packing signaling information includes the step of packing channel associated signaling information in at least one predetermined time slot in said compressed E1 signal.

9. The N:1 E1 compression method, as set forth in claim 1, wherein said packing step further includes the step of packing selected control, monitoring, and status information in at least one predetermined time slot.

10. The N:1 E1 compression method, as set forth in claim 9, wherein said packing step further includes the step of packing selected control, monitoring, and status information in a proprietary communications link occupying a predetermined time slot of the compressed E1 signal.

11. The N:1 E1 compression method, as set forth in claim 10, wherein said packing step further includes the step of packing bandwidth information for each compressed data channel in said proprietary communications link.

12. The N:1 E1 compression method, as set forth in claim 10, wherein said step of data compressing further includes the step of digital speech interpolation, and said packing step further includes the step of packing noise parameters where digital speech interpolation is performed in said proprietary communications link.

13. The N:1 E1 compression method, as set forth in claim 10, wherein said packing step further includes the step of packing alarm information in said proprietary communications link.

14. The N:1 E1 compression method, as set forth in claim 10, wherein said packing step further includes the step of packing a remote alarm indicator in said proprietary communications link.

15. The N:1 E1 compression method, as set forth in claim 10, wherein said packing step further includes the step of packing a $Sa_4$ bit in said proprietary communications link for passing said $Sa_4$ bit unaltered to a remote transcoder.

16. The N:1 E1 compression method, as set forth in claim 10, wherein said packing step further includes the step of packing $Sa_5$–$Sa_8$ bits in said proprietary communications link for passing $Sa_5$–$Sa_8$ unaltered to a remote transcoder.

17. The N:1 E1 compression method, as set forth in claim 10, wherein said packing step further includes the step of packing a data link bit in said proprietary communications link for passing said data link bit unaltered to a remote transcoder.

18. The N:1 E1 compression method, as set forth in claim 10, wherein said packing step further includes the step of packing a proprietary data link bit in said proprietary communications link having control, alarms, and status information of transcoder operations.

19. The N:1 E1 compression method, as set forth in claim 9, wherein said proprietary data link bit packing step further includes the step of packing operational information on selected system components.

20. The N:1 E1 compression method, as set forth in claim 19, wherein said packing step further includes the step of packing downloading software to a remote transcoder and control and status information therefor in said proprietary communications link.

21. The N:1 E1 compression method, as set forth in claim 1, wherein said packing step further comprises the steps of:

packing high-speed voice-band and digital data in said compressed E1 signal without compression;

packing dedicated channels in pre-assigned time slots of the compressed E1 signal; and dynamically allocating and packing compressed data in available time slots.

* * * * *